United States Patent
Kuo et al.

(10) Patent No.: US 9,216,906 B2
(45) Date of Patent: Dec. 22, 2015

(54) METHOD FOR MANUFACTURING ALUMINUM NITRIDE POWDER

(71) Applicant: Chung-Shan Institute of Science and Technology, Armaments Bureau, M.N.D., Taoyuan County (TW)

(72) Inventors: Yang-Kuao Kuo, Taoyuan County (TW); Yung-Han Huang, Taoyuan County (TW); Cheng-Hung Shih, Taoyuan County (TW); Lea-Hwung Leu, aoyuan County (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 28 days.

(21) Appl. No.: 14/140,516

(22) Filed: Dec. 25, 2013

(65) Prior Publication Data
US 2015/0175421 A1    Jun. 25, 2015

(51) Int. Cl.
*C01B 21/072*    (2006.01)

(52) U.S. Cl.
CPC ........... *C01B 21/072* (2013.01); *C01B 21/0722* (2013.01); *C01B 21/0726* (2013.01)

(58) Field of Classification Search
None
See application file for complete search history.

(56) References Cited

U.S. PATENT DOCUMENTS

| | | | | | |
|---|---|---|---|---|---|
| 2,962,359 | A | * | 11/1960 | Perieres | C01B 21/0726 423/412 |
| 4,917,877 | A | * | 4/1990 | Oguni et al. | 423/412 |
| 5,688,320 | A | * | 11/1997 | Gribkov et al. | 117/75 |
| 5,888,446 | A | * | 3/1999 | Casey et al. | 264/669 |
| 2004/0005461 | A1 | * | 1/2004 | Nagle et al. | 428/408 |
| 2010/0233393 | A1 | * | 9/2010 | Kanechika | C04B 35/581 428/34.1 |
| 2013/0171451 | A1 | * | 7/2013 | Muneoka | C01B 21/0726 428/402 |
| 2013/0244036 | A1 | * | 9/2013 | Muneoka | C01B 21/0726 428/402 |

* cited by examiner

*Primary Examiner* — Guinever S Gregorio
(74) *Attorney, Agent, or Firm* — Chun-Ming Shih

(57) ABSTRACT

A method for manufacturing aluminum nitride powder includes steps of: preparing a polymer powder, a wood powder having grain size similar with that of the polymer powder, and an alumina powder; and mixing the polymer powder, the wood powder and the alumina powder uniformly and forming granules to be carried out a single-replacement reaction by exposing the granules in a nitrogen-containing atmosphere at a temperature of 1680-1850° C.

3 Claims, No Drawings

METHOD FOR MANUFACTURING ALUMINUM NITRIDE POWDER

BACKGROUND OF THE INVENTION

1. Field of the Invention

The present invention relates to a method for manufacturing an aluminum nitride powder, and more particularly to a starting material of the aluminum nitride powder consisting of a polymer powder, carbonaceous materials and an alumina powder, which harnesses single-replacement reaction to facilitate forming the aluminum nitride powder.

2. Description of the Related Art

Aluminum nitride has been popularly applied in electronics, such as a thermal radiating substrate or packages of LED devices, with its good insulating property, a high thermal conductivity and a low dielectric constant and dielectric loss. Hence, with the features of aluminum nitride applied in some electric elements, the performance of the current semiconductor devices can be further promoted. In general, the aluminum nitride is manufactured staring with powder materials, and to be proceeded with forming, firing and after-treatments.

In order to perform a preferred thermal conductivity of the aluminum nitride, it is important to control the purity of the final product, and of course the thermal conductivity of the aluminum nitride is good while the purity of that is high. However, for the conventional method, such as single-replacement reaction, the technique for manufacturing the aluminum nitride usually has drawbacks including an excessively high processing temperature and long reaction time. Accordingly, how to overcome the foregoing drawbacks to improve the productivity of the aluminum nitride while maintain the high purity is expected.

SUMMARY OF THE INVENTION

The objective of the present invention is to provide a method of manufacturing aluminum nitride powder, characterized in that a mixed powder containing an alumina powder, a polymer powder and a carbonaceous materials is used as a precursor of the aluminum powder, wherein the polymer powder and the carbonaceous materials provide sufficient carbon atom facilitating the reaction of oxygen-nitrogen atom replacement in a nitrogen-containing atmosphere at high temperature.

In order to achieve the aforementioned object, the method for manufacturing aluminum nitride powder includes steps of:

preparing a polymer powder, a wood powder having grain size similar with that of the polymer powder, and an alumina powder;

and mixing the polymer powder, the wood powder and the alumina powder uniformly and forming granules to be carried out a single-replacement reaction by exposing the granules in a nitrogen-containing atmosphere at a temperature of 1680-1850° C.

DETAILED DESCRIPTION OF THE INVENTION

A method for manufacturing aluminum nitride (AlN) powder in accordance with the present invention includes steps, starting with a powder preparation, a granulation process, a reduction process and a decarbonization process.

A polymer powder is provided to be mixed uniformly with a wood powder to form a first mixture powder, and the scale of the wood powder is similar with that of the polymer powder. In the present invention, the polymer powder is fabricated by polyvinyl butyral (PVB). For further requirement, the first mixture powder can incorporate a carbon black with a desired weight. In above first mixture powder, the weight of polymer powder is less than that of the wood powder, and a ratio of that is in a range of 0.15:1-0.42:1.

To produce the aluminum nitride powder, an alumina powder is used as the Al source of the aluminum nitride powder, and to be mixed uniformly with the first mixture to form a second mixture powder. In the present invention, the best mode of the foregoing mixing process can be carried out by a ball mill.

After that, proceed the second mixture powder with a spray drying granulation process. The second mixture powder is then added with a binding agent, to be sprayed and dried at a predetermined temperature and in a processing time. During the spray drying granulation process, particles of the second mixture powder are completely dried and gradually bound together to form granules.

Once the granulation process is over, proceed the granules with reduction treatment. The granules are then hold by a container to be put in a nitrogen atmosphere at a temperature of 1600-1850° C. In this condition of high temperature, the carbon atoms of the granules acts as a medium for replacement reaction, and most of the oxygen atoms are separated from the alumina via crystal vibration and replaced by nitrogen atoms to form the aluminum nitride powder.

However, the product of the reduction contains aluminum nitride powder and a carbon residue which is not desired in the end that makes the product appearing gray, and therefore needs to conduct the decarbonization treatment to remove carbon. The decarbonization is carried out by providing an oxygen-containing gas, such as air, flowing through the reductive product by treating a temperature of 600-800° C.

In summary, the aluminum nitride powder obtained by foregoing processes and treatments has an excellent purity, because the starting material containing the carbonaceous materials, as previously mentioned polymer and the carbon black, provide a sufficient amount of carbon atoms that is used as the reductive medium, and of course facilitating the single-replacement reaction, and as a result of shortening the entirely manufacturing time.

Many changes and modifications in the above described embodiment of the invention are able to, of course, be carried out without departing from the scope thereof. Accordingly, to promote the progress in science and the useful arts, the invention is disclosed and is intended to be limited only by the scope of the invention.

What is claimed is:

1. A method for manufacturing aluminum nitride powder comprising steps of:

preparing a polymer powder, a wood powder, a carbon black and an alumina powder;

mixing the polymer powder, the wood powder, the carbon black and the alumina powder uniformly and forming granules;

performing a single-replacement reaction by exposing the granules in a nitrogen-containing atmosphere at a temperature of 1680-1850° C., such that carbon atoms of the granules act as a medium for replacement reaction, and most of oxygen atoms are separated from alumina via crystal vibration and replaced by nitrogen atoms to form the aluminum nitride powder; and performing a decarbonization treatment to remove carbon by providing an oxygen-containing gas flowing through the aluminum nitride powder at a temperature of 600-800° C.;

wherein a weight ratio of the polymer powder and the wood powder is in a range of 0.15:1 to 0.42:1.

2. The method for manufacturing aluminum nitride powder as claimed in claim 1, wherein the polymer powder is polyvinyl butyral (PVB).

3. The method for manufacturing aluminum nitride powder as claimed in claim 1, wherein the granules is obtained by binding the polymer powder, the wood powder, the carbon black and the alumina powder together via a spray granulation process.

\* \* \* \* \*